3,522,282
PROCESS FOR PREPARING DIBUTYLTIN MALEATE
Justin L. Hirshman, East Brunswick, and Edward J. Breza, Fords, N.J., assignors to M & T Chemicals Inc., New York, N.Y., a corporation of Delaware
No Drawing. Filed Feb. 29, 1968, Ser. No. 709,198
Int. Cl. C07f 7/22
U.S. Cl. 260—429.7
9 Claims

ABSTRACT OF THE DISCLOSURE

A process for preparing di-butyltin maleate which comprises reacting substantially stoichiometric amounts of maleic anhydride and di-butyltin oxide in the presence of an inert cycloaliphatic hydrocarbon solvent exhibiting a boiling point of at least 75° C. as a reaction medium thereby forming di-butyltin maleate; cooling said reaction medium after completion of said reaction thereby crystallizing said di-butyltin maleate; recovering said dibutyltin maleate as a product; and maintaining said inert cycloaliphatic hydrocarbon in liquid phase during said recovery.

---

This invention relates to a novel process for preparing organotin compounds. More specifically it relates to a novel process for preparing these compounds particularly characterized by the ease of obtaining desired compounds in high purity.

In accordance with certain of its aspects, the process of this invention for preparing di-butyltin maleate comprises reacting substantially stoichiometric amounts of maleic anhydride and di-butyltin oxide in the presence of an inert cycloaliphatic hydrocarbon solvent exhibiting a boiling point of at least 75° C. as reaction medium thereby forming di-butyltin maleate; cooling said reaction medium after completion of said reaction thereby crystallizing said di-butyltin maleate; recovering said crystallized di-butyltin maleate as product; and maintaining said inert aliphatic hydrocarbon solvent in liquid phase during said recovery.

The maleic anhydride which may be employed in practice of this invention may be that commercially obtainable. Maleic acid may be employed as the equivalent of maleic anhydride.

The di-butyltin oxide which may be employed in practice of this invention may be di-n-butyltin oxide, or di-i-butyltin oxide, di-t-butyltin oxide, etc. The preferred reactant in practice of the process of this invention is di-n-butyltin oxide. This oxide may be typically obtainable in purity of at least 95% having a water content of preferably less than 1%.

The inert cycloaliphatic hydrocarbon solvent which may be employed in practice of this invention as the reaction medium may include those solvents having a boiling point of at least 75° C. and having 6–16 and preferably 6–7, say 6 carbon atoms in the molecule. Typical of these inert cycloaliphatic solvents may be cycloalkanes including cyclononane, cyclohexane, cycloheptane, cyclooctane, cyclohexane, etc., including substituted cycloaliphatics, methylcyclohexane, ethylcyclohexane, 1,2-dimethylcyclohexane, methylcycloheptane, etc. Preferably the inert cycloaliphatic hydrocarbon solvent may be one having a boiling point of less than about 150° C. The preferred solvent may be cyclohexane. Various isomers or mixtures of these solvents may be employed. Commercially obtainable mixtures may be employed. Inert cycloaliphatic hydrocarbon solvent containing small amounts of other solvents may also be employed, but for attainment of the maximum advantages of the process of this invention, it is preferred to use substantially pure inert cycloaliphatic hydrocarbon solvent. Aromatic solvents such as benzene, toluene, etc., or non-cyclic solvent such as n-hexane, etc. should preferably be present, if at all, in amount less than 25% and more preferably less than 10%.

In carrying out the process of this invention, 60 to 500 parts, preferably 80 parts of an inert cycloaliphatic hydrocarbon solvent, preferably cyclohexane, are added to a reaction vessel. 37.2–42.0, preferably 39.9 parts of maleic anhydride are then added to the reaction vessel. The ratio of solvent to maleic anhydride is maintained at 1.5:1 to 12:1, preferably 2.5:1 by weight as this permits proper solubility of the product in the solvent at elevated temperatures and maximum precipitation at recovery temperatures. This insures maintenance of the desired ratio of solvent to product of 0.43:1 to 3.6:1, say 0.71:1.

The reaction mixture may be heated to 55° C.–70° C. preferably 60° C. at which point the maleic anhydride becomes molten. Agitation should be provided preferably as soon as the maleic anhydride is sufficiently molten to be stirred.

After the maleic anhydride is substantially completely melted, the di-butyltin oxide in amount of 99–105 parts, say 99.6 parts is added to the reaction vessel.

The amount of the di-butyltin oxide to be employed may probably be substantially stoichiometrically equivalent to the maleic anhydride in accordance with the following reaction:

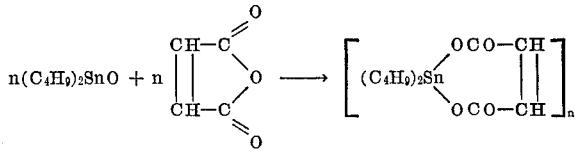

wherein $n$ is 2–4; preferably the di-butyltin oxide may be added to the reaction vessel in aliquots of 5%–15%, say 10% of the total amount to be added. During addition, the temperature of the reaction mixture may be maintained at 70° C.–80° C., preferably 75° C. Addition of the aliquots of di-butyltin oxide may be carried out over 25–40 minutes, preferably 30 minutes. After the completion of the addition to the reaction mixture of the di-butyltin oxide, the reaction mixture may be maintained below about 130° C. and preferably at 35° C.–100° C. say 75° C. for 30–90 minutes, typically 60 minutes. During the reaction, the resulting solution becomes turbid and amber colored.

At the end of this reaction, there is preferably added to the reaction mixture filter a medium such as diatomaceous earth and the mixture may be agitated for 1 to 15 minutes, preferably 5 minutes and cooled to temperature of 60° C. to 75° C., preferably about 65° C. The thus cooled mixture is then filtered at this temperature through a filter, e.g. a pressure filter, the temperature in which may preferably be controlled to be between 60° C.–70° C. during filtration.

The filtrate may thereafter be cooled slowly to room temperature during a time interval of 30 to 120 minutes, with agitation. At the end of this period, the temperature of the reaction mixture should be adjusted to 20° C. to 35° C. As the reaction mixture temperature passes through the region 35° C.–40° C., crystallization usually occurs; and a thick slurry may be obtained at 30° C. From 10 to 50 parts additional solvent may be added to thin the slurry to make product more easily isolable. The slurry may then be furthered cooled to 20° C.–25° C., and held at that temperature for 30–90 minutes. Cooling of the reaction mixture to below 40° C. unexpectedly permits precipitation of the di-butyltin maleate product in pure form as a slurry of finely divided crystals which may be recovered as by filtration or decantation. During recovery of the product, the inert cycloaliphatic hydrocarbon solvent is maintained in liquid form and the crystals are not subjected to the deteriorative or disaggregative forces which would undesirably be present at higher temperatures characteristic of distillation, for example.

The crystalline product may then be separated, e.g. decanted or preferably filtered, from the solvent to recover a substantially pure crystalline filter cake which may be washed with fresh inert cycloaliphatic hydrocarbon solvent and thereafter spin dried. The cake may preferably be broken up and dried on trays at a temperature of 50° C. to 90° C.

The product di-butyltin maleate is obtained as an off-white-to-cream colored powder in yields normally greater than 85%, and typically approaching the stoichiometric yield. Commonly, the yields may be 90%–95% of the theoretical yield. Analysis of a typical product so prepared may indicate that it may contain 33.9%–34.2%, say 34.1% tin (calc 34.2%). The saponification number may be 307–340, say 328 (theory 323). The product may be found to have (for di-n-butyltin maleate) a melting point of 135° C.–138° C.

Practice of the process of this invention will be apparent from the following examples wherein, unless otherwise indicated, all parts are parts by weight.

EXAMPLE 1

In this example, which represents practice of a preferred embodiment of the process of this invention, 160 parts by weight of cyclohexane were added to a reaction vessel together with 73.5 parts (0.75 mole) of maleic anhydride. The reaction mixture was heated to 55° C.–60° C. and stirring started as soon as the maleic anhydride was sufficiently molten to be stirred. After the maleic anhydride was almost completely molten, there was added to the reaction vessel 186.6 parts (0.75 mole) of di-n-butyltin oxide. Preferably the di-n-butyltin oxide was added in aliquots of 5% of the total (the typical aliquot being about 9 parts by weight). Addition of this material was controlled in a manner to keep the temperature at about 75° C. Preferably addition was carried out over a 25–40 minute time interval. Addition of di-n-butyltin oxide at this rate over this period of time permitted maintenance of the reaction mixture in fluid condition. After the oxide was completely added to the reaction mixture, the reaction mixture was further agitated for an additional hour at 75° C. During this time, the reaction mixture became amber colored and very turbid.

At the end of 60 minutes, dicalite filter aid in amount of 0.5 part by weight was added to the reaction mixture which was thereafter agitated for 5 minutes more while being allowed to cool to 65° C. The reaction mixture was then filtered through a preheated pressure filter maintained at temperature 65° C.–75° C.

The filtered solution was slowly cooled to room temperature over 90 minutes with agitation. As the filtrate cools to 35° C.–40° C. crystallization occurred, an exothermic condition was observed, and the reaction mixture may become thick at 30° C. An additional 20 to 25 parts solvent may be added to thin the slurry. Further cooling was then carried out to 20° C. at which temperature, the mixture was held for one hour. The so cooled mixture was filtered and the filter cake washed with 10 parts by weight of solvent and thereafter spun dry.

The filter cake was easily broken up, recovered, and then dried at 50° C.–60° C. The product so obtained was 257 parts by weight (98.5% yield) of a di-n-butyltin maleate product exhibiting a melting point of 136° C.–138° C. and a tin content of 34.2% (theory 342%). The saponification number was 325 (theory 323). The molecular weight was 631.

EXAMPLE 2

In this example, which represents practice of an alternative embodiment of the process of this invention, 80 parts by weight of methyl cyclohexane was added to a reaction vessel together with 39.5 parts (0.405 mole) of maleic anhydride. The reaction mixture was heated to 60° C.–65° C. and stirring started as soon as the maleic anhydride was sufficiently molten to be stirred. After the maleic anhydride was almost completely molten, 99.6 parts (0.400 mole) of di-n-butyltin oxide was added to the reaction vessel. The di-n-butyltin oxide was added in aliquots of 5% of the total—the typical aliquot being about five parts by weight. Addition of this material was controlled in a manner to keep the temperature at approximately 75° C. Addition was carried out over a 30 minute interval. Addition of di-n-butyltin oxide at this rate over this period of time was sufficient to maintain the reaction mixture in a fluid condition. After the oxide was completely added to the reaction mixture the reaction mixture was further agitated for an additional hour at 95° C.–100° C. During this time, the reaction mixture become amber colored and very turbid.

At the end of 60 minutes, dicalite filter aid in amount of 0.25 part by weight was added to the reaction mixture which was thereafter agitated for 5 minutes more while being allowed to cool at 65° C. The reaction mixture was then filtered through a preheated pressure filter maintained at temperature of 60° C.–70° C.

The filtered solution was slowly cooled to room temperature over a 90 minute interval with agitation. As the filtrate was cooled to 35° C.–40° C. crystallization occurred, an exotherm occurs, and the reaction mixture became thick at 30° C. 20 parts additional solvent was added to thin the slurry. Further cooling was then carried out to 20° C.–25° C. at which temperature, the mixture was held for one hour. The so cooled mixture was then filtered, the filter cake washed with 300 parts by weight of solvent, and thereafter spun dry.

The filter cake which was easily broken up was recovered and then dried at 50° C.–60° C. The di-n-butyltin maleate product so obtained exhibited a weight of 138.8 parts (97.9% yield), a melting point range of 135° C.–137° C., and a tin content of 33.9% (theory 34.2%). The saponification number was 329 (theoretical 323).

EXAMPLE 3

In this example which represents practice of an alternative embodiment of the process of this invention, 80 parts by weight of cyclohexene was added to a reaction vessel together with 39.5 parts (0.405 mole) of maleic anhydride. The reaction mixture was heated to 60° C.–65° C. and stirring started as soon as the maleic anhydride was sufficiently molten to be stirred. After the maleic anhydride was almost completely molten, 99.6 parts (0.400 mole) of di-n-butyltin oxide was added to the reaction vessel. The di-n-butyltin oxide was added in aliquots of 5% of the total—the typical aliquot being 1.8 to 2.0 parts by weight. Addition of this material was controlled in a manner to keep the temperature at approximately 75° C. Addition was carried out over a 30 minute interval. Addition of di-n-butyltin oxide at this rate over this period of time was sufficient to maintain the reaction mixture in a fluid condition. After the oxide was competely added to the reaction mixture the reaction mixture was further agitated for an additional hour at 95° C.–100° C. During this time, the reaction mixture became amber colored and very turbid.

At the end of 60 minutes, dicalite filter aid in amount of 0.25 part by weight was added to the reaction mixture which was thereafter agitated for 5 minutes more while being allowed to cool at 60° C. The reaction mixture was then filtered through a preheated pressure filter maintained at temperature of 60° C.–70° C.

The filtered solution was slowly cooled to room temperature over a 90 minute interval with agitation. As the filtrate was cooled to 35° C.–40° C. crystallization occurred, an exotherm occurs, and the reaction mixture became thick at 30° C. 20 parts additional solvent was added to thin the slurry. Further cooling was then carried out to 20° C.–25° C. at which temperature, the mixture was held for one hour. The so cooled mixture was then filtered, the filter cake washed with 300 parts by weight of solvent, and thereafter spun dry.

The filter cake which was easily broken was recovered and then dried at 50° C.–60° C. The di-n-butyltin maleate product so obtained exhibited a weight of 122.8 parts (88.47% yield) and a tin content of 34.28% (theoretical 34.2%). The saponification number was 332 (theoretical 323).

EXAMPLE 4

The procedure of Example 3 was followed except that cyclohexene was not used as the solvent. The solvent in Example 4 consisted of a mixture of 62 grams of cyclohexane and 18 grams of commercial heptane. The weights of the reactants were identical with those of Example 3.

The product obtained exhibited a weight of 136.3 grams (98.2% yield), a melting point range of 136° C.–8° C. and a molecular weight of 505. The saponification number was 324 (theory 323).

Although this invention has been illustrated by reference to specific examples, numerous changes and modifications thereof which clearly fall within the scope of the invention will be apparent to those skilled-in-the-art.

We claim:

1. An improved process for preparing freely-flowing di-butyltin maleate, said improvement comprising reacting substantially stoichiometric amounts of maleic anhydride and di-butyltin oxide in the presence of an inert cycloaliphatic hydrocarbon solvent reaction medium exhibiting a boiling point of at least 75° C. and less than 150° C., in which said di-butyltin oxide and said maleic anhydride are insoluble and said di-butyltin maleate is soluble thereby forming a solution of di-butyltin maleate; cooling said reaction medium after completion of said reaction thereby crystalizing said di-butyltin maleate; recovering said crystallized di-butyltin maleate as product; and maintaining said inert cycloaliphatic hydrocarbon solvent in liquid phase during said recovery.

2. The process for preparing anhydrous di-butyltin maleate as claimed in claim 1 wherein said inert cycloaliphatic hydrocarbon solvent contains 6–16 carbon atoms.

3. The process for preparing anhydrous di-butyltin maleate as claimed in claim 1 wherein said inert aliphatic cyclohydrocarbon solvent contains 6–7 carbon atoms.

4. The process for preparing anhydrous di-butyltin maleate as claimed in claim 1 wherein said inert cycloaliphatic hydrocarbon solvent is cyclohexane.

5. The process for preparing anhydrous di-butyltin maleate as claimed in claim 1 wherein the temperature of reaction is maintained below 130° C.

6. The process for preparing anhydrous di-butyltin maleate as claimed in claim 1 wherein the temperature of reaction is maintained at 60° C.–100° C.

7. The process for preparing anhydrous di-butyltin maleate as claimed in claim 1 wherein, after completion of reaction, said reaction medium is cooled to 15° C.–40° C. at which temperature said di-butyltin maleate precipitates.

8. The process for preparing anhydrous di-butyltin maleate as claimed in claim 1 wherein the ratio of solvent to product is maintained at 0.6:1 to 1:1.

9. An improved process for preparing anhydrous di-butyltin maleate, said improvement comprising reacting substantially stoichiometric amounts of maleic anhydride and di-butyltin oxide under substantially anhydrous conditions in the presence of an inert cycloaliphatic hydrocarbon solvent reaction medium exhibiting a boiling point of at least 75° C. and less than 150° C. in which said di-butyltin oxide and said maleic anhydride are insoluble and said di-butyltin maleate is soluble thereby forming a solution of di-butyltin maleate; cooling said reaction medium after completion of said reaction thereby crystallizing said di-butyltin maleate; filtering said crystallized di-butyltin maleate; and maintaining said inert cycloaliphatic hydrocarbon solvent in liquid phase during said filtration.

References Cited

UNITED STATES PATENTS

| | | | |
|---|---|---|---|
| 2,838,554 | 6/1958 | Gloskey | 260—429.7 |
| 3,037,040 | 5/1962 | Anderson et al. | 260—429.7 |
| 3,232,905 | 2/1966 | Kelso | 260—429.7 X |
| 3,240,795 | 3/1966 | Ramsden | 260—429.7 |
| 3,418,349 | 12/1968 | Oakes | 260—429.7 |

TOBIAS E. LEVOW, Primary Examiner

W. F. W. BELLAMY, Assistant Examiner